United States Patent [19]

Nodera

[11] Patent Number: 6,127,465
[45] Date of Patent: *Oct. 3, 2000

[54] POLYCARBONATE RESIN COMPOSITION

[75] Inventor: Akio Nodera, Ichihara, Japan

[73] Assignee: Idemitsu Petrochemical Co., Ltd., Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/923,089

[22] Filed: Sep. 4, 1997

[51] Int. Cl.[7] ..................................................... C08K 5/53
[52] U.S. Cl. .................. 524/125; 514/127; 514/139; 514/141; 514/143; 514/451
[58] Field of Search ..................... 524/125, 127, 524/139, 141, 143, 451

[56] References Cited

U.S. PATENT DOCUMENTS

| | | | |
|---|---|---|---|
| 4,507,436 | 3/1985 | Axelrod et al. | 525/67 |
| 4,672,086 | 6/1987 | Seiler et al. | 524/141 |
| 4,914,144 | 4/1990 | Muelbach et al. | 524/141 |
| 5,061,745 | 10/1991 | Wittmann et al. | 524/141 |
| 5,219,907 | 6/1993 | Niessner et al. | 524/141 |
| 5,278,212 | 1/1994 | Nishihara et al. | 524/141 |
| 5,455,292 | 10/1995 | Kakegawa et al. | 524/141 |
| 5,543,448 | 8/1996 | Laughner | 524/141 |
| 5,552,465 | 9/1996 | Witmann et al. | 524/141 |
| 5,627,228 | 5/1997 | Kobayashi | 524/141 |
| 5,658,974 | 8/1997 | Fuhr et al. | 524/141 |
| 5,674,924 | 10/1997 | Lee et al. | 524/141 |
| 5,723,526 | 3/1998 | Nagasawa | 524/141 |
| 5,750,602 | 5/1998 | Kohler et al. | 524/141 |

OTHER PUBLICATIONS

Abstract of JP07033946A, Apr. 25, 1995.
Abstract of JP04285655A, Nov. 16, 1993.
Abstract of JP61062556A, Mar. 31, 1986.

*Primary Examiner*—Bernard Lipman
*Attorney, Agent, or Firm*—Oblon, Spivak, McClelland, Maier & Neustadt, P.C.

[57] ABSTRACT

Disclosed is a polycarbonate resin composition comprising an aromatic polycarbonate (PC), a high-impact polystyrene resin (HIPS) and a non-halogen phosphate, and also talc and/or polytetrafluoroethylene (PTFE). Optionally, the composition may contain a core/shell-type, grafted, rubber-like elastic material. The composition has good flame retardancy and has good physical properties such as stiffness, impact resistance, outward appearance and flowability.

23 Claims, No Drawings

POLYCARBONATE RESIN COMPOSITION

FIELD OF THE INVENTION

The present invention relates to polycarbonate resin composition, and more precisely, to those having excellent flame retardancy and excellent physical properties of stiffness, impact resistance, outward appearance, flowability, etc.

BACKGROUND OF THE INVENTION

As having good mechanical properties (especially, impact resistance) and electric properties with high transparency, polycarbonate resins are widely utilized as engineering plastics in various fields of OA appliances, electric and electronic appliances, vehicles, building materials, etc.

Of those, OA appliances and electric and electronic appliances require high flame retardancy. For these, therefore, used are polycarbonate resins, which are among various thermoplastic resins, as having a high oxygen index and generally self-extinguishability. In order to further improve their safety in various applications, resin compositions with improved flame retardancy are much desired. Given this situation, therefore, polycarbonate resin compositions comprising halogen-containing compounds as a flame-retardant have heretofore been developed. For example, known are a variety of polycarbonate resin compositions comprising, as a flame retardant, any of halogen-containing compounds such as polycarbonate bromide oligomers and comprising, as a flame retardant aid, $Sb_2O_3$ or the like.

Recently, however, halogen-containing compounds such as highly carcinogenic dioxin, which are discharged from waste incinerators, are problematic in that they have bad influences on the environment and human bodies. For this reason, flame-retardant polycarbonate resin compositions not containing any halogen compounds but comprising only non-halogen compounds are much desired.

In addition, the thickness of shaped products of resins is often desired to be small. For their smooth shaping into thin products, resins require not only high flame retardancy but also good flowability.

Prior Art:

As one example of resin compositions satisfying those requirements, known is a polycarbonate resin composition comprising a polycarbonate resin and a styrene-containing graft copolymer, such as an acrylonitrile-butadiene-styrene resin (ABS resin), and containing a non-halogen compound as a flame retardant (see Unexamined Published Japanese Patent Application No. 2-32154). However, the styrene-containing graft copolymer to be in this resin composition is composed of substantially two or more grafting copolymers, and this is expensive. Therefore, it is desired to use any more inexpensive component to produce resin compositions having the same effect as that of the known resin composition.

On the other hand, also known is a resin composition comprising a polymer alloy of a butadiene-free polystyrene and a polycarbonate resin and containing a non-bromine flame retardant (see Unexamined Published Japanese Patent Application No. 62-4746). However, as not containing butadiene, this resin composition has low impact strength and is therefore problematic in its practical use.

Further known is a resin composition comprising a polycarbonate (PC) and an ABS resin and containing talc that acts to improve the stiffness of the composition and to improve the frosted surface appearance thereof (see Examined Published Japanese Patent Application No. 54-33262 and Unexamined Published Patent Application No.4-227650). However, the composition disclosed in the publication is problematic in that its flame retardancy is not satisfactory.

On the other hand, known is a polycarbonate resin composition comprising a polycarbonate resin and a styrene copolymer that acts to improve the flame retardancy and the flowability of the composition, such as an MBS resin, an ABS resin or a BS rubber, and containing a bromine-containing flame retardant, a flame retardant aid and an inorganic substance such as talc (see Unexamined Published Japanese Patent Application No. 54-54165). However, this composition is a halogen-containing one and is against the recent non-halogen requirement. In addition, this composition is problematic in that its heat stability is poor if the butadiene content of the styrene copolymer component therein is not smaller than 50% by weight.

SUMMARY OF THE INVENTION

Given the current situation as above, the invention is to provide a non-bromine polycarbonate resin composition not containing any expensive styrene-containing graft copolymer composed of two or more grafting monomers, such as ABS resins, but having excellent flame retardancy and excellent physical characteristics of stiffness, impact resistance, outward appearance, flowability, etc.

In order to attain the object of the invention, the present inventor has studied the flame retardancy and other physical properties of various polycarbonate resin compositions comprising various polymers in various proportions. As a result, we have found that, when a specific resin is added to a polycarbonate resin while further adding thereto specific compounds in specific proportions, a polycarbonate resin composition having the intended properties can be obtained. On the basis of this finding, we have completed the invention.

Specifically, the invention provides a polycarbonate resin composition comprising (A) from 68 to 93% by weight of an aromatic polycarbonate (PC), (B) from 5 to 30% by weight of a high-impact polystyrene resin (HIPS) containing from 2 to 30% by weight of a rubber-like elastic material, (C) from 2 to 15% by weight of a non-halogen phosphate, and (D) talc in an amount of from 3 to 25 parts by weight relative to 100 parts by weight of the sum of these (A), (B) and (C), and optionally containing, (E) a core/shell-type, grafted rubber-like elastic material in an amount of not larger than 5 parts by weight, and/or (F) polytetrafluoroethylene (PTFE) in an amount of not larger than 2 parts by weight relative to 100 parts by weight of the sum of these (A), (B) and (C).

The invention further provides a polycarbonate resin composition comprising (A) from 70 to 93% by weight of an aromatic polycarbonate (PC), (B) from 5 to 30% by weight of a high-impact polystyrene resin (HIPS), (C) from 2 to 15% by weight of a non-halogen phosphate, and (F) polytetrafluoroethylene (PTFE) in an amount of not larger than 2 parts by weight relative to 100 parts by weight of the sum of these (A), (B) and (C).

DETAILED DESCRIPTION OF THE INVENTION

Now, the invention is described in detail hereinunder.

First mentioned are the components of (A) to (D) constituting the resin composition of the invention.

(A) Polycarbonate Resin (PC)

Various aromatic polycarbonates (PC) are usable as the component (A) constituting the resin composition of the invention. Preferably used are polymers comprising repetitive units of a general formula (I):

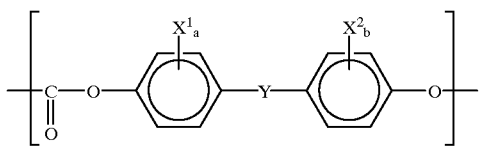

wherein $X^1$ and $X^2$ may be the same or different, and each represents a $C_{1-8}$ alkyl group (e.g., methyl, ethyl, propyl, n-butyl, i-butyl, amyl, i-amyl, hexyl, etc.); a and b indicate the number of the substituents $X^1$ and $X^2$, respectively, and each represents 0 or an integer of from 1 to 4; provided that when a and/or b are/is an integer of from 2 to 4, plural $X^1$s and/or $X^2$s may be the same or different; Y represents a single bond, a $C_{1-8}$ alkylene group (e.g., methylene, ethylene, propylene, butylene, pentylene, hexylene, etc.), a $C_{2-8}$ alkylidene group (e.g., ethylidene, i-propylidene, etc.), a $C_{5-15}$ cycloalkylene group (e.g., cyclopentylene, cyclohexylene, etc.), a $C_{5-15}$ cycloalkylidene group (e.g., cyclopentylidene, cyclohexylidene, etc.); or —S—, —SO$_2$—, —O— or —CO— bond; or a bond of a formula (II-1) or (II-2):

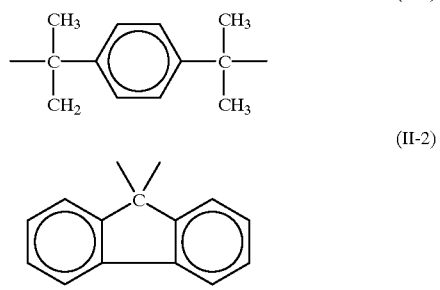

In general, the polymers are easily produced by reacting a dihydric phenol of a general formula (III):

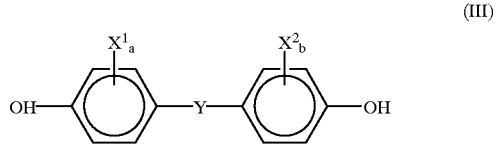

wherein $X^1$, $X^2$, a, b and Y have the same meanings mentioned above, and a carbonate precursor such as phosgene or a carbonate compound.

Briefly, for example, the dihydric phenol is reacted with a carbonate precursor such as phosgene in a solvent such as methylene chloride, in the presence of a known acid receptor and/or a known molecular weight-regulating agent; or the dihydric phenol is interesterified with a carbonate precursor such as diphenyl carbonate in the presence or absence of a solvent.

Of various dihydric phenols of formula (III), especially preferred is 2,2-bis(4-hydroxyphenyl)propane (bisphenol A). Dihydric phenols of formula (III) other than bisphenol A include, for example, bis(4-hydroxyphenyl)alkanes except bisphenol A; 1,1-(4-hydroxyphenyl)methane; 1,1-(4-hydroxyphenyl)ethane; 4,4'-dihydroxydiphenyl; bis(4-hydroxyphenyl)cycloalkanes; bis(4-hydroxyphenyl) oxide; bis(4-hydroxyphenyl) sulfide; bis(4-hydroxyphenyl) sulfone; bis(4-hydroxyphenyl) sulfoxide; bis(4-hydroxyphenyl) ether; bis(4-hydroxyphenyl) ketone, etc. In addition to these, also referred to is hydroquinone. These dihydric phenols can be used either singly or as combined.

The carbonate compound includes, for example, diaryl carbonates such as diphenyl carbonate; and dialkyl carbonates such as dimethyl carbonate and diethyl carbonate.

As the molecular weight-regulating agent, any one generally used in polymerization of carbonates is employable. One example is a monohydric phenol, which includes phenol, p-cresol, p-tert-butylphenol, p-tert-octylphenol, p-cumylphenol, nonylphenol, etc.

The aromatic polycarbonate of the component (A) constituting the resin composition of the invention may be either a homopolymer comprising one of the dihydric phenols or a copolymer comprising two or more of them. It may also be a thermoplastic, randomly-branched polycarbonate resin to be obtained from the combination of a poly-functional aromatic compound and the dihydric phenol.

The aromatic polycarbonate of the component (A) may also be a polycarbonate-polyorganosiloxane copolymer comprising organosiloxane blocks having a number-average degree of polymerization of 5 or more. It may also be a mixture of two or more of those various polycarbonate resins.

The polycarbonate of the component (A) preferably has a viscosity-average molecular weight of from 10,000 to 100,000, more preferably from 15,000 to 40,000, in view of the mechanical strength and the shapability of the composition comprising it.

Commercially-available aromatic polycarbonates which are favorably used as the component (A) in the resin composition of the invention are, for example, Taflon A1500, A3000, A2200 and B2500 (all trade names of Idemitsu Petrochemical CO., LTD.)

(B) High-Impact Polystyrene Resin (HIPS)

The high-impact polystyrene resin (HIPS) of the component (B) constituting the resin composition of the invention is a polymer to be obtained through polymerization of a mono-vinyl aromatic monomer, such as styrene or α-methylstyrene, along with a rubber-like elastic material as dissolved or mixed in the monomer.

Specific examples of the rubber-like elastic material include polybutadiene, a rubber-like elastic material containing an acrylate and/or methacrylate, a styrene-butadiene-styrene (SBS) resin, a styrene-butadiene rubber (SBR), a butadiene-acrylic rubber, an isoprene rubber, an isoprene-styrene rubber, an isoprene-acrylic rubber, an ethylene-propylene rubber, etc. Of those, especially preferred is polybutadiene. The polybutadiene to be used herein may be either a low-cis polybutadiene (for example, having from 1 to 30 mol % of 1,2-vinyl bond, and from 30 to 42 mol % of 1,4-cis bond), or a high-cis polybutadiene (for example, having not larger than 20 mol % of 1,2-vinyl bond, and not smaller than 78 mol % of 1,4-cis bond), or may also be a mixture of these. The content of the rubber-like elastic material in the component (B) is desirably from 2 to 30% by weight. If the content of the rubber-like elastic material is smaller than 2% by weight, the impact resistance of the resin composition will be often poor; but if it is larger than 30% by weight, the heat stability thereof will be often poor.

Commercially-available high-impact polystyrenes favorably usable as the component (B) in the resin composition of the invention include, for example, HT50, HT51, HT52, IT40, IT41 and IT42 (all trade names of Idemitsu Petrochemical CO., LTD.).

(C) Non-halogen Phosphate

The non-halogen phosphate of the component (C) constituting the resin composition of the invention is a compound of a general formula (IV):

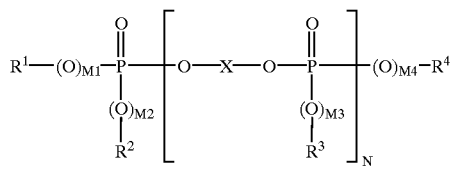

wherein $R^1$, $R^2$, $R^3$ and $R^4$ each are independently selected from optionally-substituted aryl and alkaryl groups;

X represents an arylene group;

$M^1$, $M^2$, $M^3$ and $M^4$ each are independently 0 or 1;

N represents 0 or an integer of from 1 to 5; provided that when two or more different phosphates are used in combination, N indicates an average value of those phosphates to be a positive number of from 0 to 5, preferably from 0 to 3.

The non-halogen phosphate may be a single phosphate monomer or oligomer, or may also be in the form of a mixture of plural phosphate monomers or oligomers.

In this invention, as shown in the general formula (IV) the terminology "phosphate" in non-halogen phosphate includes not only phosphate but also many type of other phosphorus oxyacid ester such as phosphite, hypophosphate and so on. Of those phosphorus oxyacid ester, preferred is phosphate.

The non-halogen phosphate constituting the component (C) for use in the invention includes, for example, non-halogen phosphate monomers such as trimethyl phosphate, triethyl phosphate, tributyl phosphate, trioctyl phosphate, tributoxyethyl phosphate, triphenyl phosphate, tricresyl phosphate, cresyldiphenyl phosphate and octyldiphenyl phosphate, and non-halogen phosphate oligomers obtained by condensing one or more kind(s) of those monomer. Of these, preferred are triphenyl phosphate and oligomers obtained by condensing the triphenyl phosphate.

Commercially-available non-halogen phosphates favorably usable as the component (C) to be in the resin composition of the invention include, for example, monomers of TPP, TCT, TOP, PX-130, CR741 and CR747, and oligomers of CR-733S and PF500 (all trade names of Daihachi Chemical Industry CO., LTD.), and PFR (trade name of Asahi Denka Kogyo K.K.).

(D) Talc

Talc of the component (D) is a magnesium silicate hydrate, and commercially-available talc is favorably used herein. Also employable is talc comprising a minor amount of aluminium oxide, calcium oxide and iron oxide in addition to silicic acid and magnesium oxide. Talc for use in the invention preferably has a mean particle size of from 0.1 to 50 μm.

Talc improves the flame retardancy of the polycarbonate resin composition, thereby resulting in the reduction in the amount of the phosphate of the component (C), which is a phosphorus-containing flame retardant, in the composition.

(E) Core/shell-type, Grafted, Rubber-like Elastic Material

The core/shell-type, grafted, rubber-like elastic material of the component (E) optionally constituting the resin composition of the invention has a two-layered structure composed of a core and a shell. The core is in a soft rubber-like condition, while the shell covering the core is in a hard resinous condition. The elastic material itself is powdery (in a granular condition). After having been mixed with a polycarbonate resin in melt, the rubber-like elastic material mostly still keeps its original granular condition. Since the rubber-like elastic material added mostly keeps its original condition in the composition, the surface layer of the shaped product of the composition is prevented from being peeled off.

The core/shell-type, grafted, rubber-like elastic material of the component (E) may be prepared through any polymerization, such as bulk polymerization, suspension polymerization or emulsion polymerization, of vinyl monomers in the presence of a rubber-like polymer. For this, preferred is emulsion polymerization.

The rubber-like polymer to be used for preparing the core/shell-type, grafted, rubber-like elastic material includes a variety of rubber-like polymers to be obtained, for example, from monomers consisting essentially of alkyl acrylates, alkyl methacrylates and/or dimethylsiloxane. As the alkyl acrylates and alkyl methacrylates, preferred are those having a $C_{2-10}$ alkyl group, such as ethyl acrylate, butyl acrylate, 2-ethylhexyl acrylate and n-octyl methacrylate.

The rubber-like polymers to be obtained from those monomers such as alkyl acrylates may also be copolymers to be obtained through copolymerization of the monomers and other copolymerizable vinyl monomers such as methyl methacrylate, acrylonitrile, vinyl acetate and/or styrene, in which the comonomers are in an amount of not larger than 30% by weight. In the copolymerization, optionally used is a crosslinking agent which includes, for example, polyfunctional monomers such as divinylbenzene, ethylene dimethacrylate, triallyl cyanurate and triallyl isocyanurate.

The vinyl monomers to be polymerized in the presence of the rubber-like polymer include, for example, aromatic vinyl compounds such as styrene and α-methylstyrene; acrylates such as methyl acrylate and ethyl acrylate; and methacrylates such as methyl methacrylate and ethyl methacrylate.

One or more of those monomers may be polymerized either singly or as combined, or may also be copolymerized with any other vinyl comonomers, for example, vinyl cyanides such as acrylonitrile and methacrylonitrile, or vinyl esters such as vinyl acetate and vinyl propionate.

The core/shell-type, grafted, rubber-like elastic material preferably comprises the rubber-like polymer in an amount of not smaller than 20% by weight. As one specific example, mentioned is an elastic MAS resin to be prepared through grafting copolymerization of from 60 to 80% by weight of n-butyl acrylate with styrene and methyl methacrylate. Commercially-available, elastic MAS resins are employable herein, which include, for example, Hiblen B621 (trade name of Nippon Zeon CO., LTD.), KM-330 (trade name of Rohm and Haas CO.), Metablen W529, Metablen S2001, Metablen C223 and Metablen B621 (trade names of Mitsubishi Rayon CO., LTD.).

As the core/shell-type, grafted, rubber-like elastic material, also favorably usable herein are acrylate-based core/shell polymers such as those disclosed in Unexamined Published Japanese Patent Application No. 59-93748.

(F) Polytetrafluoroethylene (PTFE)

Polytetrafluoroethylene (PTFE) of the component (F) to be in the resin composition of the invention acts to prevent the composition from melting and dropping down. Polytetrafluoroethylene for use in the invention has a number-average molecular weight of generally not smaller than 500,000, preferably not smaller than 1,000,000, more preferably from 1,000,000 to 10,000,000. Any known polytetrafluoroethylene is employable herein. For example, it includes Teflon 6-J (trade name of Du Pont-Mitsui Fluorochemicals COMPANY, LTD.), Polyflon D-1 and Polyflon F-103 (trade names of Daikin Industries, LTD.), Argoflon F5 (trade name of Ausimont), and Polyflon MPAFA-100 and F201 (trade names of Daikin Industries, LTD.).

Polytetrafluoroethylene with fibril-forming ability is more preferred, as making the composition have higher flame retardancy. Polytetrafluoroethylene with fibril-forming ability includes, for example, those grouped in Type 3 according to the ASTM Standard. For example, preferred are Teflon 6-J (trade name of Du Pont-Mitsui Fluorochemicals COMPANY LTD.), and Polyflon D-1 and Polyflon F-103 (trade names of Daikin Industries, LTD.).

Polytetrafluoroethylene with fibril-forming ability may be prepared, for example, by polymerizing tetrafluoroethylene in the presence of sodium, potassium or ammonium peroxydisulfide in an aqueous solvent, under a pressure of from 1 to 100 psi and at a temperature of from 0 to 200° C., preferably from 20 to 100° C.

One or more polytetrafluoroethylenes can be used singly or as combined.

Now, the compositional proportions of the components constituting the resin composition of the invention are described hereinunder.

Component (A)

The aromatic polycarbonate (PC) of the component (A) in the resin composition of the invention is from 68 to 93% by weight, preferably from 70 to 90% by weight, further preferably 75 to 85% by weight, relative to the total weight of the components (A), (B) and (C) constituting the composition.

Component (B)

The high-impact polystyrene (HIPS) of the component (B) in the resin composition of the invention is from 5 to 30% by weight, preferably from 10 to 25% by weight, relative to the total weight of the components (A), (B) and (C) constituting the composition. If the content of the component (B) is smaller than 5% by weight, the flowability of the composition will be poor. If, however, it is larger than 30% by weight, the composition could not have the intended flame retardancy (1.5 mm, V-0 or V-1) and, in addition, its impact resistance is greatly lowered.

The component (B) comprises from 2 to 30% by weight of a rubber-like elastic material. If the content of the rubber-like elastic material in the component (B) is smaller than 2% by weight, the impact strength of the composition could not be improved. If, however, it is larger than 30% by weight, the heat resistance of the composition is lowered and, in addition, the surface layer of the shaped product of the composition is peeled off to worsen its appearance.

Component (C)

The non-halogen phosphate of the component (C) to be in the resin composition of the invention is from 2 to 15% by weight, preferably from 5 to 15% by weight, relative to the total weight of the components (A), (B) and (C) constituting the composition. In the case that talc of the component (D) is not included in the resin composition of the invention, the non-halogen phosphate of the component (C) to be in the resin composition of the invention is preferably from 6 to 15% by weight. If the content of the non-halogen phosphate in the composition is smaller than 2% by weight, the composition could not have the intended flame retardancy. If, however, it is larger than 15% by weight, the heat resistance and the impact strength of the composition are greatly lowered.

Component (D)

Talc of the component (D) to be in the resin composition of the invention is from 3 to 25 parts by weight, preferably from 5 to 20 parts by weight, relative to 100 parts by weight of the sum of the components (A), (B) and (C) constituting the composition. If the content of talc is smaller than 3 parts by weight, the flame retardancy of the composition could not be improved to the desired degree and, in addition, the stiffness of the composition could not be improved satisfactorily. If, however, it is larger than 25 parts by weight, the physical properties such as impact strength of the composition are greatly lowered.

Component (E)

The core/shell-type, grafted, rubber-like elastic material of the component (E) to be in the resin composition is to further improve the impact strength of the composition, and it may be up to 5 parts by weight, preferably from 1 to 3 parts by weight. In the case that talc of the component (D) is not included in the resin composition of the invention, the component (D) to be in the resin composition of the invention is preferably up to 2% by weight. If the content of the core/shell-type, grafted, rubber-like elastic material in the composition is larger than 5 parts by weight, such is inconvenient as lowering the stiffness and the heat resistance of the composition.

Component (F)

Polytetrafluoroethylene (PTFE) of the component (F) to be in the resin composition of the invention is to make the composition have the intended flame retardancy (UL-94, V-0), and may be not larger than 2 parts by weight, preferably from 0.1 to 0.5 parts by weight, relative to 100 parts by weight of the sum of the components (A), (B) and (C) constituting the composition. Even if PTFE of larger than 2.0 parts by weight is added to the composition, such will be ineffective in improving the flame retardancy of the composition to the intended degree but will be rather disadvantageous as often lowering the impact resistance of the composition and worsening the appearance of the shaped product of the composition.

The resin composition of the invention may optionally contain additives, in addition to the components (A) to (F), by which the appearance of the shaped product of the composition may be further improved, the composition may have antistatic properties, and the weather resistance and the stiffness of the composition may be further improved. For example, the additives include surface lubricants and mold releases (for improving the appearance of shaped products of the composition), such as aliphatic carboxylates and paraffinic compounds; antistatic agents; polyamidopolyether block copolymers (for imparting permanent antistatic ability to the composition); ultraviolet absorbents such as benzotriazole compounds and benzophenone compounds; photostabilizers (for improving the weather resistance of the composition) such as hindered amines; glass fibers (for improving the stiffness of the composition); and colorants (for coloring the composition). The amounts of those additives are not specifically defined, but shall fall within the range not interfering with the intrinsic properties of the resin composition of the invention.

Now referred to hereinunder is the production of the resin composition of the invention.

The resin composition of the invention can be produced by formulating each component optionally along with any desired additives in suitable proportions, followed by kneading them. To formulate and knead the components, employable are any ordinary devices, such as ribbon blenders, Henschel mixers, Bumbury mixers, drum tumblers, single-screw extruders, double-screw extruders, co-kneaders, multi-screw extruders, etc. The heating temperature for the kneading may fall generally between 240 and 300° C.

The invention is described concretely with reference to the following Examples and Comparative Examples, which, however, are not intended to restrict the scope of the invention.

EXAMPLES 1 TO 4, AND COMPARATIVE EXAMPLES 1 TO 9

The components shown in Table 1 below were formulated in the proportions indicated therein, fed into an extruder (VS40 manufactured by Tanabe Plastic Machine CO.), kneaded therein at 260° C., and pelletized. In all Examples and Comparative Examples, antioxidants of 0.1 parts by weight of Irganox 1076 (manufactured by Ciba Specialty Chemicals K.K. Japan) and 0.1 parts by weight of Adekastab C (manufactured by Asahi Denka Co.) were added to the compositions. The resulting pellets were dried at 80° C. for 12 hours, and then molded through injection molding at a molding temperature of 260° C. to prepare test pieces. The thus-prepared test pieces were tested for their properties, and the test data obtained are shown in Table 1. The materials used herein and the methods employed for evaluating the test pieces are referred to after Table 1.

TABLE 1

| | | Example 1 | Example 2 | Example 3 | Example 4 | Comparative Example 1 | Comparative Example 2 | Comparative Example 3 |
|---|---|---|---|---|---|---|---|---|
| Composition | (A) PC | 75% | 76% | 85% | 71% | 75% | 85% | 59% |
| | (B) HIPS | | | | | | | |
| | HIPS 1 | 20% | 16% | — | — | 20% | — | 33% |
| | HIPS-2 | — | — | 10% | 21% | — | 10% | — |
| | SBS (outside the invention) | — | — | — | — | — | — | — |
| | (C) Phosphate | | | | | | | |
| | P-1 | 5% | — | — | — | 5% | — | — |
| | P-2 | — | 8% | — | — | — | — | — |
| | P-3 | — | — | 5% | 8% | — | 5% | 8% |
| | (D) Talc | 20 parts | 5 parts | 15 parts | 10 parts | — | — | 10 parts |
| | (E) Rubber-like Elastic Material | | | | | | | |
| | G-1 | — | 5 parts | — | — | — | — | — |
| | G-2 | — | — | 3 parts | 3 parts | — | 3 parts | 3 parts |
| | (F) PTFE | — | 0.2 parts | 0.1 parts | 0.1 parts | — | 0.1 parts | 0.1 parts |
| Test Methods | (1) IZOD | 15 | 60 | 65 | 55 | 25 | 70 | 5 |
| | (2) Modulus of Bending Elasticity | 4500 | 3400 | 4100 | 3900 | 2800 | 2700 | 3700 |
| | (3) HDT (height) | 100° C. | 100° C. | 105° C. | 95° C. | 95° C. | 105° C. | 90° C. |
| | (4) SFL (260° C.) | 60 cm | 65 cm | 55 cm | 60 cm | 65 cm | 60 cm | 70 cm |
| | (5) LOI | 35% | 34% | 34% | 37% | 29% | 28% | 32% |
| | (6) 1/16-inches UL94 | V-1 | V-0 | V-0 | V-0 | V-2 | V-2 | V-1 |

| | | Comparative Example 4 | Comparative Example 5 | Comparative Example 6 | Comparative Example 7 | Comparative Example 8 | Comparative Example 9 |
|---|---|---|---|---|---|---|---|
| Composition | (A) PC | 93% | 76% | 62% | 75% | 75% | 80% |
| | (B) HIPS | | | | | | |
| | HIPS 1 | — | — | 17% | 20% | — | 20% |
| | HIPS-2 | 2% | — | — | — | 16% | — |
| | SBS (outside the invention) | — | 16% | — | — | — | — |
| | (C) Phosphate | | | | | | |
| | P-1 | 5% | — | 21% | 5% | — | — |
| | P-2 | — | 8% | — | — | — | — |
| | P-3 | — | — | — | — | 9% | — |
| | (D) Talc | 19 parts | 5 parts | 15 parts | 30 parts | 10 parts | 20 parts |
| | (E) Rubber-like Elastic Material | | | | | | |
| | G-1 | — | 5 parts | 3 parts | — | — | — |
| | G-2 | — | — | — | — | 8 parts | — |
| | (F) PTFE | 0.1 parts | 0.2 parts | 0.1 parts | 0.1 parts | 0.1 parts | — |
| Test Methods | (1) IZOD | 15 | 55 | 5 | 5 | 50 | 20 |
| | (2) Modulus of Bending Elasticity | 4200 | 2800 | 4300 | 4800 | 3700 | 4300 |
| | (3) HDT (height) | 105° C. | 90° C. | 70° C. | 105° C. | 85° C. | 115° C. |
| | (4) SFL (260° C.) | 45 cm | 70 cm | 80 cm | 50 cm | 60 cm | 50 cm |
| | (5) LOI | 36% | 32% | 37% | 37% | 36% | 27% |

| | | | | | | | |
|---|---|---|---|---|---|---|---|
| t h o d s | (6) 1/16-inches UL94 | V-0 | V-1 | V-0 | V-0 | V-0 | HB |

*) In Table, "%" is "% by weight", and "parts" is "parts by weight" relative to 100 parts by weight of (A) + (B) + (C).

In Table 1, the abbreviations of the components are as follows:
(A) PC: Aromatic polycarbonate, Taflon A2200 (trade name of Idemitsu Petrochemical CO., LTD.). This has a molecular weight of 22,000. Bisphenol A is used as the starting dihydric phenol.
(B) HIPS: High-impact polystyrene resin
  HIPS-1: HT52 (trade name of Idemitsu Petrochemical CO., LTD). This is a graft copolymer of a rubber-like elastic material (polybutadiene) as grafted with polystyrene, containing 10% by weight of the rubber-like elastic material. This has a molecular weight of 130,000, and an MI of 2.2 g/10 min (200° C., 5 kg) as measured according to JIS K7210.
  HIPS-2: IT42 (trade name of Idemitsu Petrochemical CO., LTD.). This is a graft copolymer of a rubber-like elastic material (polybutadiene) as grafted with polystyrene, containing 7% by weight of the rubber-like elastic material. This has a molecular weight of 100,000, and a MI of 7.2.
  SBS: Vector 8550-D (trade name of Dexco Polymers). This contains 70% by weight of a rubber-like elastic material (polybutadiene).
  H-4: DP611 (ABS resin, manufactured by Nippon Synthetic Rubber CO., LTD). This has an MI of 11.0 (220° C., 10 kg) as measured according to JIS K7210.
(C) Phosphate: Non-halogen phosphate
  P-1: TPP (triphenyl phosphate, manufactured by Daihachi Chemical Industry CO., LTD.).
  P-2: PX-130 (trade name of Daihachi Chemical Industry CO., LTD.).
  P-3: CR-733S (trade name of Daihachi Chemical Industry CO., LTD.).
(D) Talc: FFR (trade name of Asada Milling CO., LTD.). This has a mean particle size of 0.7 μm.
(E) Core/shell-type, grafted, rubber-like elastic material
  G-1: Hiblen B621 (trade name of Nippon Zeon CO., LTD). This contains not smaller than 50% by weight of a rubber-like elastic material (polybutyl acrylate)
  G-2: Metablen S2001 (trade name of Mitsubishi Rayon CO., LTD). This contains not smaller than 50% by weight of a rubber-like elastic material (polydimethylsiloxane).
(F) PTFE: Polytetrafluoroethylene, F201 (trade name of Daikin Industries, LTD.). This has a molecular weight of from 4,000,000 to 5,000,000.

Test Methods for Evaluating Properties of Samples:
IZOD (Izod impact strength):
  In accordance with ASTM D256, each sample of ⅛ inches thick was tested at 23° C. to obtain its Izod impact strength. In general, samples having an Izod impact strength of not smaller than 15 kg-cm/cm are preferred in practical use.
Modulus of Bending Elasticity:
  Each sample was tested in accordance with ASTM D790 (test condition: 23° C., 4 mm) to obtain its modulus of bending elasticity (unit: mpa). The data obtained may be the criterion for the stiffness of the resin composition. In general, samples having a modulus of bending elasticity of not smaller than 3000 mpa are preferred in practical use.
HDT (heat deformation temperature):
  Each sample of ⅛ mm thick was tested in accordance with ASTM D648 (load: 18.6 kg/cm$^2$) to obtain its heat deformation temperature (unit: ° C.). The data obtained may be the criterion for the heat resistance of the resin composition. Depending on the use of the composition but in general, samples having an HDT of not lower than 80° C. are preferred in practical use.
SFL (spiral flow length):
  Each sample was tested in accordance with an Idemitsu method (shaping temperature: 260° C., mold temperature: 60° C., thickness of shaped test piece: 3 mm, width of shaped test piece: 10 mm, injection pressure: 110 MPu) to obtain its SFL (cm). The data obtained may be the criterion for the flowability of the resin composition. In general, samples having an SFL of not smaller than 50 cm are preferred in practical use.
LOI (limiting oxygen index):
  Each sample having a thickness of 3 mm and a width of 6 mm was tested in accordance with ASTM D2863 (test condition: 23° C.) to obtain its LOI (%). The data obtained may be the criterion for the flame retardancy of the resin composition.
1/16-inches UL94:
  Each sample of 1/16 inches thick was tested in accordance with UL94 combustion test. Samples on a level of from V-0 to V-1 satisfy good flame retardancy in practical use. HB means that the flame retardancy of the sample is not on the practical level.

As is obvious from the data in Table 1, the samples of the invention of Examples 1 to 4 all have good flame retardancy on the level of from V-0 to V-1 (1/16 inches thick), while having good impact resistance, stiffness and flowability. In addition, as having good heat resistance, they are usable as housing materials. Through the addition of a specific amount of talc to those samples, the amount of the phosphorus-containing flame retardant, phosphate could be reduced.

From the data in Table 1, it is also obvious that the resin compositions of Comparative Examples 1 to 9, which are outside the scope of the invention, could not attain the object of the invention.

Now, the test data obtained herein will be further discussed in more detail hereinunder, while comparing the samples of Examples and those of Comparative Examples.

EXAMPLE 1/COMPARATIVE EXAMPLES 1 AND 7

The resin composition of Example 1 is comprised of only the indispensable components (A), (B), (C) and (D). Though the impact strength of this sample is somewhat insufficient (IZOD 15), its stiffness, heat resistance, flowability and flame retardancy are all good. The addition of talc to this sample produced significant improvements in LOI (limiting oxygen index) to 35% and in UL-94 to V-1.

As opposed to this, the resin composition of Comparative Example 1 does not contain the component (D), talc. This has a low LOI (29%), and its UL-94 is V-2. Thus, the flame retardancy of the sample of Comparative Example 1 is poor and, in addition, its stiffness is also poor (2800 mpa).

As for the resin composition of Comparative Example 7, of which the talc content is higher than the defined range, its impact strength is extremely low (IZOD 5), and its flowability is poor (SFL 50 cm).

EXAMPLE 2/COMPARATIVE EXAMPLE 5

The resin composition of Example 2 comprises the high-impact polystyrene resin containing a rubber-like elastic material of the component (B) within the defined range, and additionally contains the rubber-like elastic material of the component (E) and polytetrafluoroethylene of the component (F). Not only its flame retardancy is good (LOI 35%; UL-94 V-0), but also its impact strength, stiffness, heat resistance and flowability are all good. As compared with the resin composition of Example 1 not containing PTFE of the component (F), the resin composition of Example 2 has higher flame retardancy (UL-94, V-0).

The resin composition of Comparative Example 5 is the same as that of Example 2, except that the high-impact polystyrene of the component (B) in the former was replaced by SBS resin. The SBS resin is not within the scope of the component (B), as containing 70% by weight of a rubber-like elastic material (polybutadiene), which is above the defined range. The resin composition of Comparative Example 5 is inferior to that of Example 2 with respect to the rigidity (modulus of bending elasticity 2800) and the flame retardancy (LOI 32%; UL-94 V-1) The surface layer of the sample of Comparative 5 is peeled off to worsen its outward appearance.

EXAMPLE 3/COMPARATIVE EXAMPLE 2

Like that of Example 2, the resin composition of Example 3 has good flame retardancy and its other physical properties are also good. As compared with the resin composition of Example 1 not containing the component (F), PTFE, the resin composition of Example 3 has better flame retardancy (UL-94, V-0).

The resin composition of Comparative Example 2 is the same as that of Example 3, except that the former does not contain the component (D), talc. It is known that the sample of Comparative Example 2 comprising only the phosphorus-containing flame retardant (phosphate) could not have the intended flame retardancy (LOI 28%; UL-94 V-2). The addition of the phosphate only could not increase LOI of the sample. In addition, the stiffness of the sample of Comparative Example 2 is low (modulus of bending elasticity 2700).

EXAMPLE 4/COMPARATIVE EXAMPLE 8

Like that of Example 2, the resin composition of Example 4 has good flame retardancy and its other physical properties are also good. As compared with the resin composition of Example 1 not containing the component (F), PTFE, the resin composition of Example 4 has better flame retardancy (UL-94, V-0).

The resin composition of Comparative Example 8 is the same as that of Example 4, except that, in the former, the amount of the component (B), high-impact polystyrene resin (HIPS) is reduced while that of the component (E), core/shell-type, grafted, rubber-like elastic material is increased. Though having such a larger amount of the rubber-like elastic material over the defined range, the physical properties of the resin composition of Comparative Example 8 are not improved. Specifically, its impact strength is not improved (IZOD 50), its stiffness is poor (modulus of bending elasticity 3700), and its heat resistance is low (HDT 85° C.)

COMPARATIVE EXAMPLES 3 AND 4

In the resin composition of Comparative Example 3, the amount of the component (B), high-impact polystyrene resin (HIPS) is larger than the defined range (35 parts by weight). The impact strength of this comparative composition is extremely low (IZOD 5), and its flame retardancy is poor (LOI 32%; UL-94 V-1).

On the contrary, the amount of the component (B) in the resin composition of Comparative Example 4 is smaller than the defined range (2 parts by weight). The flowability of this comparative composition is extremely low (SFL 45 cm).

COMPARATIVE EXAMPLES 6 AND 9

In the resin composition of Comparative Example 6, the amount of the component (C), non-halogen phosphate is larger than the defined range; while the resin composition of Comparative Example 9 does not contain the component (C).

Of the composition of Comparative Example 6 containing such a large amount of the component (C), the impact strength (IZOD 5) and the heat resistance (HDT 70° C.) are extremely low. On the other hand, the composition of Comparative Example 9 not containing the component (C) has poor flame retardancy with no increase in LOI (LOI 27%; UL-94 HB).

EXAMPLES 5 TO 8, AND COMPARATIVE EXAMPLES 10 TO 16

The components shown in Table 2 below were formulated in the proportions indicated therein, from which were prepared test pieces in the same manner as in Example 1. Those test pieces were tested for their properties, and the test data obtained are shown in Table 2. The materials used herein are referred to after Table 2. The testing methods employed are the same as those in Example 1.

TABLE 2

| Composition No. | | Example 5 | Example 6 | Example 7 | Example 8 | Comparative Example 10 | Comparative Example 11 |
|---|---|---|---|---|---|---|---|
| C (A) PC | | 72% | 70% | 75% | 88% | 80% | 64% |
| o (B) HIPS | | | | | | | |
| m H-1 | | 18% | 17% | — | — | 20% | 16% |

TABLE 2-continued

| Composition No. | | Example 5 | Example 6 | Example 7 | Example 8 | Comparative Example 10 | Comparative Example 11 |
|---|---|---|---|---|---|---|---|
| Compo | H-2 | — | — | 15% | 6% | — | — |
| | Polystyrene | | | | | | |
| nents | H-3 (outside the invention) | — | — | — | — | — | — |
| | H-4 (outside the invention) | — | — | — | — | — | — |
| | (C) Phosphate Monomer | 10% | 13% | 10% | 6% | — | 20% |
| | (D) PTFE | 0.1 parts | 0.5 parts | 0.3 parts | 0.5 parts | 0.1 parts | 0.1 parts |
| Test Methods | (1) 1/16-inches UL94 | V-0 | V-0 | V-0 | V-0 | HB | V-0 |
| | (2) IZOD (Kg-cm/cm. 23° C.) | 31 | 24 | 25 | 54 | 26 | 10 |
| | (3) HDT (°C.) | 86 | 80 | 85 | 97 | 123 | 72 |
| | (4) SFL (cn. 260° C.) | 65 | 70 | 72 | 60 | 48 | 75 |

| Composition No. | | Comparative Example 12 | Comparative Example 13 | Comparative Example 14 | Comparative Example 15 | Comparative Example 16 |
|---|---|---|---|---|---|---|
| Compo | (A) PC | 50% | 88% | 72% | 75% | 88% |
| | (B) HIPS | | | | | |
| | H-1 | 35% | 2% | — | — | — |
| | H-2 | — | — | — | 15% | — |
| | Polystyrene | | | | | |
| nents | H-3 (outside the invention) | — | — | 18% | 18% | — |
| | H-4 (outside the invention) | — | — | — | — | 6% |
| | (C) Phosphate Monomer | 15% | 10% | 10% | 10% | 6% |
| | (D) PTFE | 0.5 parts | 0.1 parts | 0.1 parts | — | — |
| Test Methods | (1) 1/16-inches UL94 | V-2 | V-0 | V-0 | V-2 | V-0 |
| | (2) IZOD (Kg-cm/cm. 23° C.) | 4 | 65 | 5 | 33 | 50 |
| | (3) HDT (°C.) | 76 | 90 | 88 | 86 | 85 |
| | (4) SFL (cn. 260° C.) | 73 | 43 | 60 | 64 | 45 |

*) In Table, "%" is "% by weight", and "parts" is "parts by weight" relative to 100 parts by weight of (A) + (B) + (C).

In Table 2, the abbreviations of the components are as follows:
(A) PC: Aromatic polycarbonate, Taflon A2200 (trade name of Idemitsu Petrochemical CO. LTD.). This has a molecular weight of 22,000. Bisphenol A is used as the starting dihydric phenol.
(B) HIPS: High-impact polystyrene resin
   H-1: HT52 (trade name of Idemitsu Petrochemical CO. LTD). This is a graft copolymer of a rubber-like elastic material (polybutadiene) as grafted with polystyrene. This has a molecular weight of 130,000, and an MI of 2.2 g/10 min (200° C., 5 kg) as measured according to JIS K7210.
   H-2: IT42 (trade name of Idemitsu Petrochemical CO. LTD). This is a graft copolymer of a rubber-like elastic material (polybutadiene) as grafted with polystyrene. This has a molecular weight of 100,000, and an MI of 7.2.
   H-3: HH30 (trade name of Idemitsu Petrochemical CO. LTD). This has a molecular weight of 250,000, and an MI of 3.6.
   H-4: DP611 (ABS resin manufactured by Nippon Synthetic Rubber CO. LTD). This has an MI of 11.0 (220° C., 10 kg) as measured according to JIS K7210. H-3 and H-4 are an ordinary polystyrene resin and ABS resin, respectively, not reinforced with any rubber-like elastic material. These were used in comparative samples in place of the component (B), HIPS.
(C) Phosphate Monomer: TPP (triphenyl phosphate, manufactured by Daihachi Chemical Industry CO., LTD.).
(F) PTFE: Polytetrafluoroethylene, F201 (trade name of Daikin Industries, CO. LTD). This has a molecular weight of from 4,000,000 to 5,000,000.

As is obvious from the data in Table 2, the samples of the invention of Examples 5 to 8 all have good flame retardancy on the level of V-0 (1/16 inches thick), while having good impact resistance and flowability. In addition, as having good heat resistance, they are usable as housing materials.

The resin composition of Comparative Example 10 does not contain the component (C), phosphate monomer. Its flame retardancy is not good, as being on the level of HB. In addition, its flowability is poor (SFL: 48 cm).

The resin composition of Comparative Example 11 contains a large amount (25 parts by weight) of a phosphate monomer that is larger over the defined range of from 5 to 15 parts by weight relative to 100 parts by weight of the sum of the components (A) and (B). This is problematic in its practical use in that its heat resistance is low (heat deformation temperature: 72 C.) and its impact strength is low (Izod impact strength: 10 kg-cm/cm).

The resin composition of Comparative Example 12 contains a large amount (41% by weight) of a high-impact polystyrene (HIPS) that is larger than the defined range of from 5 to 30% by weight. This could not be put into practical use, since its impact strength is extremely low (Izod impact strength: 4 kg-cm/cm).

The resin composition of Comparative Example 13 contains a small amount (2% by weight) of a high-impact polystyrene (HIPS) that is smaller than the defined range. Its fluidity is poor (SFL: 43 cm).

The resin composition of Comparative Example 14 contains a polystyrene resin not reinforced with any rubber-like elastic material, in place of the high-impact polystyrene of the component (B). Since its impact strength is extremely low (Izod impact strength: 5 kg-cm/cm), the composition could not be put into practical use.

The resin composition of Comparative Example 15 does not contain polytetrafluoroethylene. In the UL-94 combustion test, this composition dripped, and the cotton substrate was fired. The flame retardancy of this composition is not good, as being on the level of V-2.

The resin composition of Comparative Example 16 contains an ABS resin not reinforced with any rubber-like elastic material, in place of the high-impact polystyrene of the component (B) The flame retardancy of this composition is on the level of V-0, but its flowability is poor (SFL: 45 cm). This composition could not be put into practical use.

As has been mentioned hereinabove, the polycarbonate resin composition of the present invention comprises an aromatic polycarbonate (PC), a high-impact polystyrene (HIPS), a non-halogen phosphate, a core/shell-type, rubber-like elastic material and talc in specific proportions, without containing any expensive resin such as ABS resin, and it has high flame retardancy, flowability, impact resistance and stiffness. The composition may further contain polytetrafluoroethylene, in addition to those components, to have much higher flame retardancy.

The flame-retardant composition of the invention contains no halogen such as bromine, and therefore causes no environmental pollution.

If talc is added to the composition, the amount of the phosphorus-containing flame-retardant phosphate to be in the composition may be reduced.

While the invention has been described in detail and with reference to specific embodiments thereof, it will be apparent to one skilled in the art that various changes and modifications can be made therein without departing from the spirit and scope thereof.

What is claimed is:

1. A polycarbonate resin composition, consisting essentially of:
    (A) from 68–93% by weight of an aromatic polycarbonate (PC), (B) from 5–30% by weight of a high-impact polystyrene resin (HIPS) containing from 2–30% by weight of a rubbery elastic material, (C) from 2–15% by weight of a non-halogen phosphate, the percentages based on the sum of components (A), (B) and (C), (D) talc in an amount of from 3–25 parts by weight and (E) a core/shell grafted, rubbery elastic material prepared by polymerizing at least one monomer selected from the group consisting of alkyl acrylates, alkyl methacrylates and dimethylsiloxane as the main component of the monomers polymerized in an amount of 1 to not greater than 5 parts by weight, each of (D) and (E) relative to 100 parts by weight of the sum of components (A), (B) and (C).

2. The polycarbonate resin composition as claimed in claim 1, wherein the content of rubbery polymer in the core/shell grafted, rubbery elastic material of component (E) is not less than 20% by weight.

3. The polycarbonate resin composition as claimed in claim 1, wherein said talc (D) has a mean particle size of 0.1–50 μm.

4. The polycarbonate resin composition as claimed in claim 1, wherein the aromatic polycarbonate component (A) has a viscosity average molecular weight ranging from 10,000–100,000.

5. The polycarbonate resin composition as claimed in claim 1, wherein the rubbery elastic material retains its granular condition upon admixture with polycarbonate component (A) in a melt.

6. The polycarbonate resin composition as claimed in claim 1, wherein the core/shell grafted, rubbery elastic material has a two-layered structure composed of a core and a shell.

7. A polycarbonate resin composition, consisting essentially of:
    (A) from 68 of 93% by weight of an aromatic polycarbonate (PC), (B) from 5–30% by weight of a high-impact polystyrene resin (HIPS) containing from 2–30% by weight of a rubbery elastic material, (C) from 2–15% by weight of a non-halogen phosphate, the percentage amounts based on the sum of (A), (B) and (C), (D) talc in an amount of from 3–25 parts by weight, (E) a core/shell grafted, rubbery elastic material prepared by polymerizing at least one monomer selected from the group consisting of alkyl acrylates, alkyl methacrylates and dimethylsiloxane as the main component of the monomers polymerized in an amount of 1 to not greater than 5 parts by weight and (F) polytetrafluoroethylene (PTFE) in an amount of not greater than 2 parts by weight, each of (D), (E) and (F) relative to 100 parts by weight of the sum of components (A), (B) and (C).

8. The polycarbonate resin composition as claimed in claim 7, wherein the content of rubbery polymer in the core/shell grafted, rubbery elastic material of component (E) is not less than 20% by weight.

9. The polycarbonate resin composition as claimed in claim 7, wherein (D) talc has a mean particle size of from 0.1–50 μm.

10. The polycarbonate resin composition as claimed in claim 7, wherein (F) polytetrafluoroethylene (PTFE) has a number average molecular weight of not less than 500,000.

11. The polycarbonate resin composition as claimed in claim 7, wherein the (F) polytetrafluoroethylene (PTFE) has a fibril-forming ability.

12. The polycarbonate resin composition as claimed in claim 7, wherein the (A) aromatic polycarbonate (PC) has a viscosity average molecular weight ranging from 10,000–100,000.

13. The polycarbonate resin composition as claimed in claim 7, wherein the rubbery elastic material retains its granular condition upon admixture with polycarbonate component (A) in the melt.

14. The polycarbonate resin composition as claimed in claim 7, wherein the core/shell grafted, rubbery elastic material has a two-layered structure composed of a core and a shell.

15. A polycarbonate resin composition, consisting essentially of:

(A) from 70–93% by weight of an aromatic polycarbonate (PC), (B) from 5–30% by weight of a high-impact polystyrene resin (HIPS) having a melt index ranging from 2.2 to 7.2 and containing from 2–30% by weight of a rubbery elastic material, and (C) from 2–15 parts by weight of a non-halogen phosphate, the percentages based on the sum of (A), (B) and (C), and (F) polytetrafluoroethylene in an amount of not greater than 2 parts by weight relative to 100 parts by weight of the sum of components (A), (B), and (C).

16. The polycarbonate resin composition as claimed in claim 15, wherein (F) polytetrafluoroethylene (PTFE) has a number average molecular weight of not less than 500,000.

17. The polycarbonate resin composition as claimed in claim 15, wherein (F) polytetrafluoroethylene (PTFE) has a fibril-forming ability.

18. The polycarbonate resin composition as claimed in claim 15, wherein the (A) aromatic polycarbonate (PC) has a viscosity average molecular weight ranging from 10,000–100,000.

19. A polycarbonate resin composition, consisting essentially of:

(A) from 70–93% by weight of an aromatic polycarbonate (PC), (B) from 5–30% by weight of a high-impact polystyrene resin (HIPS) containing from 2–30% by weight of a rubbery elastic material, and (C) from 2–15 parts by weight of a non-halogen phosphate, the percentages based on the sum of (A), (B) and (C), (E) a core/shell grafted, rubbery elastic material prepared by polymerizing at least one monomer selected from the group consisting of alkyl acrylates, alkyl methacrylates and dimethylsiloxane as the main component of the monomers polymerized in an amount of 1 to not greater than 5 parts by weight, and (F) polytetrafluoroethylene in an amount of not greater than 2 parts by weight relative to 100 parts by weight of the sum of components (A), (B), and (C).

20. The polycarbonate resin composition as claimed in claim 1, wherein component (B) is a high impact polystyrene resin (HIPS) which is prepared by polymerizing a monovinyl aromatic monomer in the presence of polybutadiene dissolved or mixed in the monomer.

21. The polycarbonate resin composition as claimed in claim 7, wherein component (B) is a high impact polystyrene resin (HIPS) which is prepared by polymerizing a monovinyl aromatic monomer in the presence of polybutadiene dissolved or mixed in the monomer.

22. The polycarbonate resin composition as claimed in claim 15, wherein component (B) is a high impact polystyrene resin (HIPS) which is prepared by polymerizing a monovinyl aromatic monomer in the presence of polybutadiene dissolved or mixed in the monomer.

23. The polycarbonate resin composition as claimed in claim 19, wherein component (B) is a high impact polystyrene resin (HIPS) which is prepared by polymerizing a monovinyl aromatic monomer in the presence of polybutadiene dissolved or mixed in the monomer.

* * * * *